US005700504A

United States Patent [19]

Hale, Jr.

[11] Patent Number: 5,700,504
[45] Date of Patent: Dec. 23, 1997

[54] METHOD FOR MAINTAINING INTERIOR QUALITY OF IRRADIATED SHELL EGGS

[75] Inventor: Kirk K. Hale, Jr., Daytona Beach, Fla.

[73] Assignee: Michael Foods, Inc., Minneapolis, Minn.

[21] Appl. No.: 515,228

[22] Filed: Aug. 15, 1995

[51] Int. Cl.⁶ ............................................. A23L 1/32
[52] U.S. Cl. .................. 426/240; 426/298; 426/300; 426/614
[58] Field of Search ........................... 426/614, 240, 426/298, 300

[56] References Cited

U.S. PATENT DOCUMENTS

| Re. 24,814 | 4/1960 | Brasch et al. | 99/221 |
|---|---|---|---|
| 2,456,909 | 12/1948 | Brasch | 21/54 |
| 2,497,817 | 2/1950 | Hale et al. | 99/161 |
| 2,593,223 | 4/1952 | Trelease et al. | 99/161 |
| 2,806,797 | 9/1957 | Brasch et al. | 99/221 |
| 2,858,224 | 10/1958 | Darrah | 99/161 |
| 3,093,489 | 6/1963 | Alexander et al. | 99/217 |
| 3,321,316 | 5/1967 | De Paolis et al. | 99/177 |
| 3,483,005 | 12/1969 | Urbain et al. | 99/217 |
| 3,658,558 | 4/1972 | Rogers et al. | 99/161 |
| 3,843,813 | 10/1974 | Driggs | 426/241 |
| 4,853,238 | 8/1989 | Huang | 426/241 |
| 5,266,338 | 11/1993 | Cascione et al. | 426/32 |
| 5,281,431 | 1/1994 | Dunckel | 476/510 |
| 5,290,583 | 3/1994 | Reznik et al. | 426/614 |
| 5,431,939 | 7/1995 | Cox et al. | 426/301 |

FOREIGN PATENT DOCUMENTS

| 717935 | 9/1965 | Canada | 99/2 |
|---|---|---|---|
| 220 223 A1 | 3/1985 | Germany . | |
| 880456 | 10/1961 | United Kingdom . | |
| WO 80/01457 | 7/1980 | WIPO . | |
| WO 88/01834 | 3/1988 | WIPO . | |

OTHER PUBLICATIONS

C.Y. Ma et al.; Gamma Irradiation of Shell Eggs, Internal and Sensory Quality, Physicochemical Characteristics, and Functional Properties, *Can. Inst. of Food Science and Tech. J.* 23:226–232 (1990).

P.S. Elias and A. J. Cohen (Eds.); *Recent Advances in Food Irradiation* Elsevier Biomedical; pp. 1–25 (1983).

E. S. Josephson and M.S. Peterson (Eds.); *Preservation of Food by Ionizing Radiation* vol. 1:329–334 (1982).

Combination Processes in Food Irradiation, *International Atomic Energy Agency, Vienna*, pp. 181–203, 265–289, 349–366 (1981).

P.S. Elias and A.J. Cohen; *Radiation Chemistry of Major Food Components*, Elsevier Scientific Publishing Co., pp. 63, 115–118, 126–130 (1977).

E. Adem et al.; Radiation Sterilization of Orange Juice, *Revista Mexicana de Fisica*, 19:1–14 (1970).

H.R. Ball et al.; Physical and Functional Properties of Gamma Irradiated Liquid Egg White, pp. *Poultry Science*, 47:1481 (1968).

*Primary Examiner*—Anthony J. Weier
*Attorney, Agent, or Firm*—Myers Bigel Sibley & Sajovec, LLP

[57] ABSTRACT

A method for reducing irradiation-induced changes in shell eggs and shell-less intact packaged eggs undergoing irradiation sufficient to cause a three-log reduction in Salmonella sp. The method utilizes pre-radiation heat treatment.

5 Claims, No Drawings

METHOD FOR MAINTAINING INTERIOR QUALITY OF IRRADIATED SHELL EGGS

FIELD OF THE INVENTION

The present invention relates to methods of preventing the deterioration of interior egg quality which results from the treatment of eggs with absorbed irradiation doses sufficient to cause a two to three-log, and preferably a four-log, reduction in Salmonella species, thereby maintaining the interior quality of the eggs so treated. The present invention more specifically relates to maintaining the interior quality of shell eggs and shell-less packaged intact eggs which have been treated with sufficient irradiation to cause a two to three-log, and preferably a four-log, reduction in Salmonella species in the egg.

BACKGROUND OF THE INVENTION

Ionizing radiation from sources such as electron beam accelerators, gamma sources, or X-ray tubes can be used to pasteurize intact shell eggs or shell-less intact packaged eggs. Pasteurization techniques for eggs are generally discussed in the *Egg Pasteurization Manual*, USDA Agricultural Research Service (hereinafter "USDA Manual"). Heat pasteurization methods are discussed at pp. 14–16; radiation pasteurization at pp. 20–21.

It is known that irradiation of eggs affects the interior quality of treated eggs, resulting in an immediate deterioration in and thinning of the physical structure of the thick egg white, as well as production of an objectionable odor (Manual, p. 21; *Radiation Chemistry of Major Food Components*, P. S. Elias and A. J. Cohen, Eds., Elsevier Scientific Publishing Company (1977), 115–118). Irradiated egg white can resemble egg white associated with aged eggs having United States Department of Agriculture (USDA) quality grade of C or worse. The thinning of albumen in irradiated eggs is so severe that the eggs are not suitable for uses requiring at least some thick egg white, such as fried or poached eggs. Thus, while irradiation has been shown effective at reducing Salmonella and other microorganisms in shell eggs and egg products, its use has been limited in treating eggs for human consumption due to irradiation-induced changes in egg quality. Seven to nine log reductions of Salmonella sp. have been obtained with absorbed doses of about 1.5 to 3 kiloGray (KGy).

PCT Patent Application Publication WO 88/01834 to Ball, Swartzel and Foegeding discloses a method of pasteurizing liquid egg product by heating the liquid egg and then subjecting it to ionizing radiation, where the ionizing radiation is itself insufficient to pasteurize the egg (i.e., insufficient to cause a nine-log cycle reduction of Salmonella in the egg).

SUMMARY OF THE INVENTION

A first aspect of the present invention is a method of treating a shell egg irradiated with ionizing radiation at a dose at least sufficient to cause a three-log reduction in Salmonella sp.. The method comprises heating the shell egg prior to the irradiation to reduce irradiation-induced thinning of the shell egg's albumen. In one particular embodiment, the method may be practiced where the absorbed dose of the ionizing radiation is between 0.1 kiloGray and 3.0 kiloGray; the shell egg may be heated to a temperature of from about 130° F. to about 145° F. and held at the temperature for a time of from about 10 minutes to about 45 minutes.

A second aspect of the present invention is a method of treating a sealed package containing a shell-less intact egg. The method comprises: (a) heating the shell-less intact packaged egg; and (b) irradiating the shell-less intact packaged egg with ionizing radiation at a dose at least sufficient to cause a three log reduction in Salmonella sp. The package may be flushed flushed with carbon dioxide prior to sealing the package. In one particular embodiment, the method may be practiced where the absorbed dose of the ionizing radiation is between 0.1 kiloGray and 3.0 kiloGray; the shell-less intact egg may be heated to a temperature of from about 130° F. to about 145° F. and held at the temperature for a time of from about 10 minutes to about 45 minutes.

The foregoing and other objects and aspects of the present invention are explained in detail in the specification set forth below.

DETAILED DESCRIPTION OF THE INVENTION

The foregoing objects are achieved by a method of treating shell eggs and shell-less intact packaged eggs. The method prevents the immediate deterioration in interior quality which is seen in eggs undergoing irradiation sufficient to cause a two to three-log, and preferably a four-log, reduction in Salmonella sp. As used herein, the deterioration of interior egg quality is most easily assessed by measuring albumen thinning. The present method comprises the step of applying thermal treatments to eggs prior to irradiation with a predetermined dose of ionizing radiation sufficient to cause a three to four-log cycle reduction in Salmonella. The present invention is suitable for use with shell eggs and shell-less intact packaged eggs.

Stabilization of the native structure of the egg white is associated with high interior quality eggs. Egg albumen is not a homogenous mass but rather consists of layers of albumen having different characteristics (see e.g., *Poultry Meat and Egg Production*, Parkhurst and Mountney, eds., Van Nostrand Reinhold Company, New York, p. 42–43 (1988)). Using the methods of the present invention, irradiation-induced changes such as thinning of egg albumen are not seen in shell eggs or packaged intact shell-less eggs receiving irradiation treatments.

The methods of the present invention may be practiced by heating eggs (shell eggs or shell-less packaged intact eggs) to an internal temperature of from about 130° F. to about 135° F. or up to 145° F., and holding the eggs for time of from about 10 minutes up to about 45 minutes. The thermostabilized eggs are then treated with ionizing radiation sufficient to cause a two or three-log, and preferably a four-log, cycle reduction in Salmonella sp. in the egg interior.

Any suitable method of heating the shell eggs or shell-less packaged intact eggs may be used in practicing the present invention, including but not limited to the use of hot water baths, steam, radio waves, microwaves, and ohmic heating methods.

When shell-less intact packaged eggs are used in the methods of the present invention, it is desirable to reduce air space and remove excess air from the package. This may be accomplished as is known in the art by flushing the package with a gas, such as carbon dioxide or nitrogen, prior to sealing the package.

Any suitable source of ionizing radiation may be used in the methods of the present invention, including but not limited to electron beam accelerators, gamma sources (such as from a cobalt 60 or cesium-137 source), or X-ray tubes. Commercial plants using cobalt-60 sources to administer gamma radiation are presently available sources of ionizing radiation for treating food products, see, e.g., *Combination Processes in Food Irradiation*, International Atomic Energy Agency, Vienna, 1981, at 413–420. The absorbed dose of radiation used in the present invention is that sufficient to cause at least a two log or three-log, and preferably a four-log, cycle reduction in Salmonella sp.. Suitable absorbed doses range from a low of between about 0.1 to 0.5 kiloGray, to a high of from about 1.0, 2.0, 3.0, 4.0 or to 5.0 kiloGray. When shell-less intact packaged eggs are used, the eggs are preferably irradiated after packaging.

Any suitable method of packaging intact shell-less eggs may be used in practicing the present invention, provided the existing internal relationship of egg white and yolk is not disturbed. Suitable packages include flexible pouches or plastic trays. An example of a suitable packaging method is the MULTIVAC™ (Multivac, Inc., Kansas City, Mo.) packaging system which can be used to package intact shell-less eggs, as is known in the art.

As used herein, "egg" refers to arian eggs, including but not limited to those of chicken, duck, quail, goose, turkey, and ostrich. The term shell egg as used herein refers to arian eggs which are contained in the natural intact shell. As used herein, "shell-less" refers to arian eggs which have been removed from the natural shell, while a "shell-less intact" egg refers to an egg that has been removed from the natural shell and whose components retain the same relationship as in the shell egg (e.g., the relationship of egg white and yolk is not disturbed when the shell is removed; no egg white or yolk is removed or added to the shell-less egg). Such shell-less intact eggs may be packaged in single-egg servings. While not wishing to be held to a single theory, applicants surmise that some of the natural anti-microbial defenses of the egg are retained when the egg white and yolk remain in their natural relationship, even though the shell is removed.

The method of the present invention maintains the interior quality of shell eggs and shell-less intact packaged eggs treated with ionizing radiation sufficient to cause a three-log or four-log reduction in Salmonella sp.; that is, the thermostabilization method of the present invention prevents or reduces the irradiation-induced changes in interior egg quality which would otherwise be seen in eggs irradiated at similar absorbed doses of radiation.

Interior quality of eggs may be assessed by measuring Haugh units or by grading eggs in accordance with USDA standards. The Haugh unit is a widely used measure of albumen condition and an indirect indication of the internal quality of an egg. See, e.g., Stadelman and Cotterill, *Egg Science and Technology*, pp. 35–36 (Avi Publishing Company, Westport Conn., 1977 (2d ed.)). Grading of eggs is in accordance with United States Department of Agriculture (USDA) standards (see Stadleman and Cotterill, supra, at pp. 31–35). Detailed instruction for egg grading standards are provided in the USDA Egg Grading Manual.

The following examples are provided to illustrate the present invention, and should not be construed as limiting thereof. In these examples, min. means minute, °F means degrees Fahrenheit, kGy means kiloGray, and CFU means colony forming units.

EXAMPLE 1

Irradiation With and Without Thermostabilization

Freshly laid (less than one day old) Grade AA medium eggs were broken and deposited by hand into individual cells of MULTIVAC™ formed packaging film, gas flushed using either nitrogen or carbon dioxide gas, and sealed in a package unit containing six individually sealed eggs (a 1×6 pack), as is known in the art. Twelve 1×6 packs were constructed, and the 1×6 packs were then subjected to either 0 or 40 minutes in a 135° F. water bath, then refrigerated and stored at 40° F. after heating. Eggs were then treated with 0, 0.5, or 1.0 kGy gamma irradiation from a commercial Cobalt 60 source (Vindicator facility, Mulberry, Fla). TABLE 1. The eggs were refrigerated after irradiation.

Interior egg quality was assessed four weeks after irradiation treatment. Albumen thickness was assessed and recorded in Haugh Unit values. See Ma et al. *Canadian Institute of Food Science and Technology Journal*, 23;226 (1990). For each radiation treatment protocol, Haugh unit scores (a measure of albumen thickness, averaged for the six eggs in each 1×6 pack) were higher for eggs receiving thermostabilization treatment compared to those receiving the same irradiation and gas flush treatment but no thermostabilization (TABLE 1). Average Haugh score for $CO_2$-flushed packs receiving irradiation (packs 2 and 3) was 43; average Haugh score for $CO_2$-flushed packs receiving irradiation and thermostabilization (packs 5 and 6, TABLE 1) was 82.5. Of egg packs receiving irradiation and thermostabilization, Haugh unit scores were higher for those eggs receiving $CO_2$ treatment (packs 5 and 6, averaged Haugh value 82.5) compared to those flushed with nitrogen (packs 11 and 12, averaged Haugh value 67).

The pH of the albumen from each egg was measured at four weeks post-irradiation and reported as an average for each 1×6 pack (TABLE 1). The pH values were generally low for all treatments, ranging from 7.4 (1) to 8.03 (10). The pH of albumen in freshly laid eggs is approximately 7.6, and will reach 9 in 1–3 days depending upon the storage temperature (USDA Manual, p. 3).

Color of the shell-less intact eggs at four weeks post irradiation was assessed by visual inspection. Any discoloration was scored as positive for off-color. As noted in TABLE 1, discolored eggs were found in all treatment groups.

Microbial numbers were assessed by total aerobic plate count per Bacteriological Analytical Manual, Food and Drug Administration (AOAC, 1992). The numbers of CFU/gram for all treatments was low ($\leq 100$), indicating that some of the natural defenses of the egg remain active when the yolk and white are essentially intact although removed from the shell.

The results shown in TABLE 1 demonstrate that thermostabilization treatment protected egg white from the thinning which has been associated with irradiation. Additionally, the $CO_2$ gas flush may have provided some additional protection against the thinning effect of irradiation, as compared to eggs flushed using nitrogen gas. While not wishing to be held to any single theory, the present inventors postulate that the heating step causes denaturation and re-naturation of egg proteins. The re-naturation of proteins may produce a protein structure which is more resistant to irradiation-induced changes, such as changes caused by the presence of free radicals created during the irradiation process.

TABLE 1

Shell-less Eggs:
Effects of Thermostabilization and Irradiation
Five Weeks Post-Heating

| | Gas Flush | 135° F. min. | kGy | Avg Haugh Units | Avg. Albm'n pH | Off Color | CFU/ gram |
|---|---|---|---|---|---|---|---|
| 1 | $CO_2$ | 0 | 0 | 79 | 7.40 | 1/6 | <10 |
| 2 | $CO_2$ | 0 | 0.5 | 48 | — | 0/6 | 95 |
| 3 | $CO_2$ | 0 | 1.0 | 38 | 7.90 | 2/6 | 10 |
| 4 | $CO_2$ | 40 | 0 | 86 | 7.53 | 0/6 | 10 |
| 5 | $CO_2$ | 40 | 0.5 | 84 | — | 1/6 | 100 |
| 6 | $CO_2$ | 40 | 1.0 | 81 | 7.64 | 1/6 | 10 |
| 7 | $N_2$ | 0 | 0 | 66 | 7.47 | 0/6 | 10 |
| 8 | $N_2$ | 0 | 0.5 | 50 | — | 3/6 | 100 |
| 9 | $N_2$ | 0 | 1.0 | 22 | 8.01 | 1/6 | <10 |
| 10 | $N_2$ | 40 | 0 | 85 | 8.03 | 1/6 | <10 |
| 11 | $N_2$ | 40 | 0.5 | 64 | — | 3/6 | <10 |
| 12 | $N_2$ | 40 | 1.0 | 70 | 7.85 | 1/6 | <10 |

Evaluation conducted 4 weeks post irradiation.

EXAMPLE 2

Evaporative Cooling and Egg Heat Loss

Graded AA Large uncooked eggs were subjected to standard retort treatments and placement in hot rooms to evaluate the heat loss experienced by the eggs and the effects on egg quality. Eggs (180 eggs per treatment) were subjected to one of four treatments: Control (no heat); Group A (retort only); Group B (retort treatment, placement in hot room with slow cool) and Group C (retort treatment, placement in hot room with faster cool).

Eggs were placed in plastic cooking flats (manufactured by KUHL) and lashed within wire baskets to a plastic pallet in a standard retort vessel. Virgin well water was added to the vessel to about ⅔ capacity and steam injection was initiated. After the water reached 135° F. this water temperature was maintained for 10 minutes. Steam was then discontinued and the retort vessel drain process was started. The wire baskets of eggs were removed from the retort vessel as soon as the drain process was completed, and hand carried to a hot room maintained at 138° F.

Data Tracer reports (computer programmed, wireless temperature sensors) indicated that approximately 20 minutes was required for the water temperature to reach 135° F. These data also indicate that internal egg temperature continued to increase during the drain process. However, egg temperature (measured by Data Tracer device) decreased in the hot room, presumably due to evaporative cooling associated with the high air velocity and low relative humidity environment of the hot room (relative humidity was less than 40%). In fact, eggs in the A treatment (retort only with no hot room) showed less temperature decrease than the hot room treated eggs (Groups B and C) (data not shown). The lower relative humidity caused faster decrease in egg temperature than ambient air.

These data, when considered in conjunction with the physics of heat of vaporization, indicate that air heating of wet eggs results in a more rapid heat loss than similar wet eggs held at ambient temperatures (i.e., temperatures where evaporative cooling occurs). High water vapor content heated air would be required to maintain the temperature of eggs after removal from the water.

EXAMPLE 3

Irradiation With and Without Thermostabilization: Continued

Twelve 1×6 packs of shell-less intact Grade AA medium eggs were constructed as described in Example 1. The 1×6 packs were then subjected to either 0 or 40 minutes in a 135° F. water bath, and cooled and stored at 40° F. after heating. Eggs were then treated with either 0, 0.5, or 1.0 kGy irradiation as noted in Example 1. Eggs were refrigerated (40° F.) following irradiation.

Eggs were assessed at seven weeks post-irradiation by determining the USDA Broken Out (BO) score, where 1, 2 or 3 indicates a USDA BO score of AA; 4, 5 or 6 indicates a USDA BO score of A; and 7, 8 or 9 indicates a USDA BO score of B. Irradiation odor was assessed subjectively, with 0 indicating no odor, ± indicating a slight odor, and + indicating a distinct odor. Off color was assessed for each egg in the 1×6 pack, and scored as a "yes/no". Microbial analysis (total aerobic plate count according to the Bacteriological Analytical Manual, Food and Drug Administration (AOAC 1992)) was assessed by counting the number of Colony Forming Units (CFU) per gram of egg contents (yolk and white).

As noted in TABLE 2, albumen quality followed the same trend as that observed in Example 1, namely, irradiated product that had not been thermostabilized (packs 2, 3, 8 and 9; average USDA BO score 6.7) showed reduced albumen quality compared to corresponding thermostabilized eggs (packs 5, 6, 11 and 12; average USDA BO score 4).

Some of the irradiated eggs were observed to have the distinct odor which has been associated with irradiation. A distinct odor (rated +) occurred in all four nitrogen-flushed and irradiated egg packs; a slight odor (+/−) occurred in two of the four $CO_2$ treated and irradiated egg packs. A higher incidence of yolk mottling was observed in the irradiated eggs, and was possibly due to damage to the yolk membrane. Possible factors contributing to the yolk mottling include the heat and irradiation treatments, and the unintentional freezing of the egg packs after irradiation.

Microbial analysis showed that all treatments were low in total aerobic organisms (≦100 CFU/gram), again indicating that some of the natural defenses of the egg remain active when the yolk and white are essentially intact although removed from the shell.

The results shown in TABLE 2 indicate that thermostabilization treatment protected egg white from deleterious changes which have been associated with irradiation.

TABLE 2

Shell-less Eggs:
Effects of Thermostabilization and Irradiation
Seven Weeks Post-Irradiation

| | Gas Flush | 135° F. (min.) | kGy | USDA BO Score | Irrad. Odor | Off Color | CFU/ gram |
|---|---|---|---|---|---|---|---|
| 1 | $CO_2$ | 0 | 0 | 4 | 0 | 0/6 | <10 |
| 2 | $CO_2$ | 0 | 0.5 | 7+ | +/− | 4/6 | 20 |
| 3 | $CO_2$ | 0 | 1.0 | 6+ | 0 | 4/6 | <10 |
| 4 | $CO_2$ | 40 | 0 | 5 | 0 | 0/6 | <10 |
| 5 | $CO_2$ | 40 | 0.5 | 4 | 0 | 2/6 | <10 |
| 6 | $CO_2$ | 40 | 1.0 | 5 | +/− | 2/6 | <10 |
| 7 | $N_2$ | 0 | 0 | 3 | 0 | 0/6 | <10 |
| 8 | $N_2$ | 0 | 0.5 | 7+ | + | 2/6 | <10 |
| 9 | $N_2$ | 0 | 1.0 | 7+ | + | 5/6 | 100 |
| 10 | $N_2$ | 40 | 0 | 4 | 0 | 2/6 | <10 |
| 11 | $N_2$ | 40 | 0.5 | 3 | + | 3/6 | <10 |
| 12 | $N_2$ | 40 | 1.0 | 4 | + | 4/6 | 10 |

Evaluation conducted 7 weeks post irradiation.
BO = USDA Broken Out Scores (AA = 1, 2 or 3; A = 4, 5 or 6; B = 7, 8 or 9).

EXAMPLE 4

Shell Eggs

Freshly laid Grade AA medium shell eggs (180 eggs per treatment) were subjected to 0 or 40 minutes in a 135° F.

water bath. Eggs were then treated with 0, 0.5 or 1.0 kGy of gamma irradiation. Results are presented in TABLE 3.

Albumen thickness was assessed in Haugh units; scores were lower in eggs that did not undergo thermal treatment prior to irradiation. This same effect was noted after 8 weeks with irradiated eggs showing USDA Broken Out scores in the low Grade B range, whereas the thermostabilized eggs remained in the Grade A classification.

Eggs were also assessed for irradiation odor and color when broken out. Odor was assessed subjectively, with 0 indicating no odor, ± indicating a slight odor, and + indicating a distinct odor. Off color was assessed for each egg and scored as a "yes/no" response.

Irradiated eggs had a cooked odor (flavor) characteristic of irradiation. This off flavor was faint, especially in the 0.5 kGy treatments, and was more noticeable after cooking (frying) and subsequent re-heating by microwave. One of the thermostabilized irradiated eggs had a red discoloration of the albumen, possibly due to a complex of iron with conalbumen. The samples of this experiment were inadvertently frozen following irradiation, and this could have caused damage to the yolk membrane allowing iron to migrate into the albumen.

TABLE 3

Shell Eggs: Effects of Thermostabilization and Irradiation on Interior Quality at Five and Eight Weeks

| 138° (min) | kGy | $X_1$ | $X_2$ | $X_3$ | $X_4$ | $X_5$ | X | Irrad'n Odor (5 wks) | USDA BO (8 wks) | Off color (8 wks) |
|---|---|---|---|---|---|---|---|---|---|---|
| 0 | 0 | 69 | 71 | 80 | 89 | 83 | 78.4 | 0 | 6 | 0 |
| 0 | 0.5 | 48 | 47 | 52 | 38 | 44 | 45.8 | +/− | 9+ | 0 |
| 0 | 1.0 | 50 | 49 | 46 | 45 | 50 | 48.0 | + | 9 | 0 |
| 40 | 0 | 93 | 88 | 89 | 95 | 101 | 93.2 | 0 | 5 | 0 |
| 40 | 0.5 | 81 | 83 | 90 | 80 | 81 | 83.0 | +/− | — | — |
| 40 | 1.0 | 86 | 79 | 93 | 96 | 84 | 87.6 | + | 4 | Red |

TABLE 3-continued

Shell Eggs: Effects of Thermostabilization and Irradiation on Interior Quality at Five and Eight Weeks

| 138° (min) | kGy | $X_1$ | $X_2$ | $X_3$ | $X_4$ | $X_5$ | X | Irrad'n Odor (5 wks) | USDA BO (8 wks) | Off color (8 wks) |
|---|---|---|---|---|---|---|---|---|---|---|

BO = (USDA) Broken Out Scores (AA = 1, 2, or 3; A = 4, 5, or 6; B = 7, 8, or 9).

The results of this Example indicate that thinning of the albumen in shell eggs following irradiation can be reduced by a thermostabilization process employed prior to irradiation.

The foregoing is illustrative of the present invention and is not to be construed as limiting thereof. The invention is defined by the following claims, with equivalents of the claims to be included therein.

That which is claimed is:

1. A method of treating a shell egg irradiated with ionizing radiation at a dose at least sufficient to cause a three-log reduction in Salmonella sp., comprising heating said shell egg prior to said irradiation to reduce irradiation-induced thinning of said shell egg's albumen that would occur in the absence of said heating.

2. A method according to claim 1 wherein the absorbed dose of said ionizing radiation is between 0.1 kiloGray and 3.0 kiloGray.

3. A method according to claim 1 wherein said shell egg is heated to a temperature of from about 130° F. to about 145° F. and held at said temperature for a time of from about 10 minutes to about 45 minutes.

4. A method of treating a shell egg comprising:
   (a) heating said shell egg to a temperature of from about 130° F. to about 145° F.; then
   (b) holding said shell egg at said temperature for a time of from about 10 minutes to about 45 minutes; and then
   (c) irradiating said shell egg with ionizing radiation at a dose at least sufficient to cause a three log reduction in Salmonella sp.

5. A method according to claim 4 wherein the absorbed dose of said ionizing radiation is between 0.1 kiloGray and 3.0 kiloGray.

* * * * *